United States Patent [19]
Herbert

[11] 3,891,997
[45] July 1, 1975

[54] HIP-JOINT PROSTHESIS

[76] Inventor: Jean Jules Marie Ernest Herbert, 11, Boulevard de la Roche de Roi, Aix-Les-Bains, France

[22] Filed: Mar. 11, 1974

[21] Appl. No.: 449,841

[30] Foreign Application Priority Data
Feb. 20, 1974 France .............................. 74.06551

[52] U.S. Cl. ...................................... 3/1; 128/92 C
[51] Int. Cl. .............................................. A61f 1/24
[58] Field of Search ..... 3/1; 128/92 C, 92 CA, 92 R

[56] References Cited
UNITED STATES PATENTS
3,608,096  9/1971  Link............................................ 3/1
3,722,002  3/1973  Charnley..................................... 3/1

OTHER PUBLICATIONS
"Factors In The Design of An Artificial Hip Joint" by J. Charnley, Proceedings The Institution of Mechanical Engineers, 1966–67, Vol. 181, part 3J, pp. 104–108.

Primary Examiner—Ronald L. Frinks
Attorney, Agent, or Firm—Karl F. Ross; Herbert Dubno

[57] ABSTRACT

A prosthetic hip joint comprises a femoral element formed with a ball head and a stem projecting from the head and adapted to be received within the upper end of a femur, and a generally hemispherical socket element adapted to be secured in the ilium at the acetabulum thereof and having an inner surface formed as a generally hemispherical cavity adapted to snugly receive the ball head. The outer surface of the socket element is subdivided at a step into a lower quarter-spherical region having a center of curvature lying above the center of curvature of the ball-receiving cavity, and an upper quarter-spherical region adjoining the lower region and having a center of curvature coinciding with the center of curvature of the ball-receiving cavity. The step between the two quarter-cylindrical regions is formed with a chamfer and both of these regions are formed with a plurality of criss-crossing grooves, in at least one of which is received a metal wire allowing the synthetic-resin socket element to be viewed in an X-ray. The ball head of the femoral element is formed with a neck that is tapered into the stem and forms a pair of shoulders thereon.

8 Claims, 5 Drawing Figures

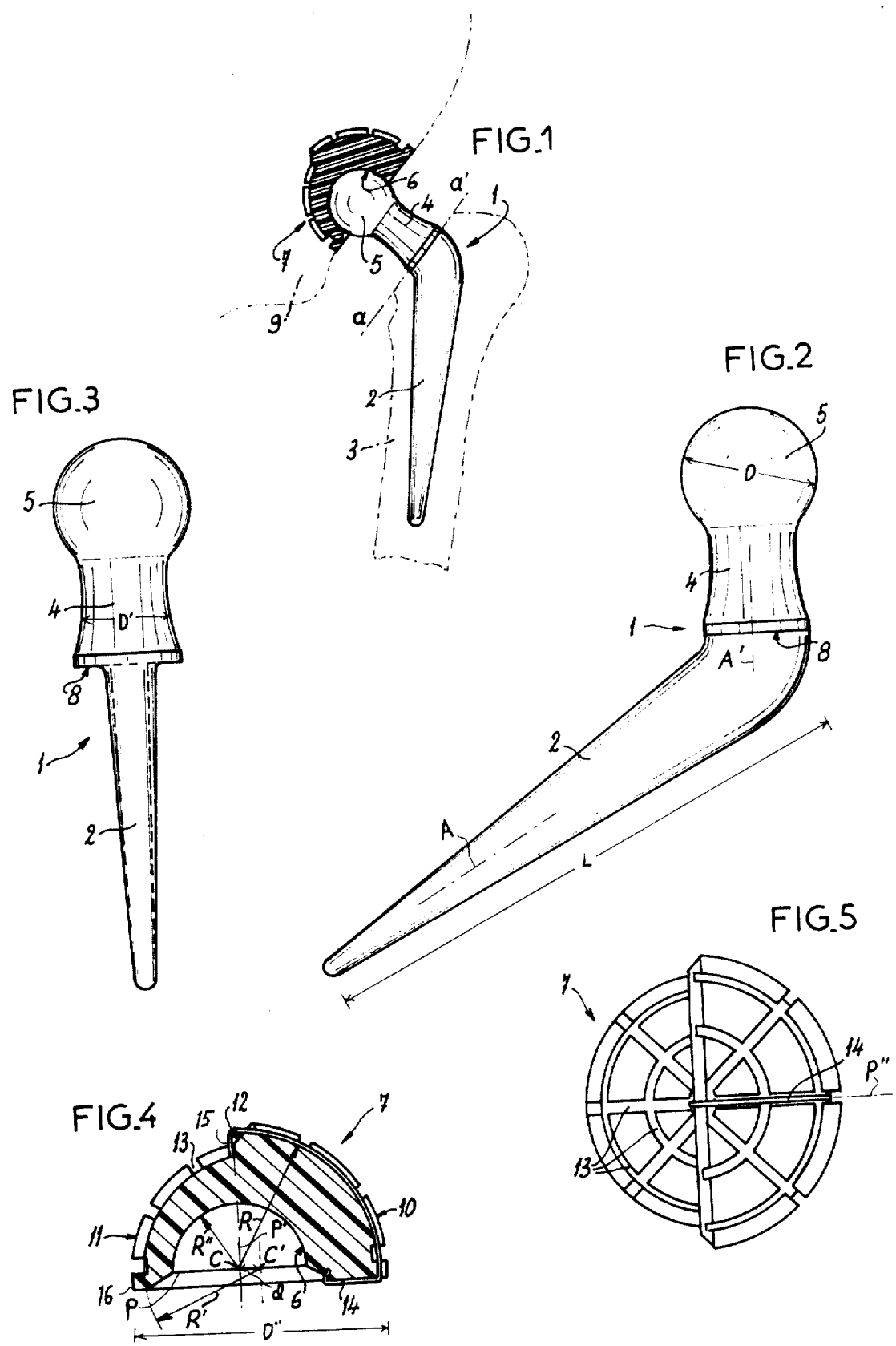

HIP-JOINT PROSTHESIS

FIELD OF THE INVENTION

The present invention relates to a prosthetic hip joint.

BACKGROUND OF THE INVENTION

A hip joint prosthesis is known which comprises a generally hemispherical socket element which is received in the ilium at the acetabulum thereof. A ball head carried on the end of a stem which is held within the upper end of a femur is received within this socket and allows pivoting of the femur relative to the pelvic bone.

In the original joints of this type the socket was of regular thickness. Such an arrangement was found disadvantageous in that the force exerted by the ball head on the socket is considerably greater in an upward direction than in a lateral or downward direction. Recourse was then had to a socket structure wherein the outer surface of the socket was hemispherical and had a center of curvature which was above the center of curvature of the ball-receiving cavity of this socket. Thus the socket was thicker above the ball than to the side of this ball or below it. Such an arrangement has been found disadvantageous in that the strength of the socket above the ball is not uniform.

Another problem with such sockets is that they are difficult to mount securely within the cavity formed in the ilium. Thus a frequent problem is that they become loosened, requiring further surgical intervention to secure them tightly in place again, and ofter requiring their replacement with sockets of larger dimensions. Yet another problem with such sockets is that it is almost impossible to tell by means of an X-ray whether the socket is properly in place, as the socket is frequently made of a synthetic-resin material transparent to X-radiation.

The femoral element of the invention carrying the ball head is traditionally formed with a neck connecting the ball head to a tapered stem. This neck terminates at the stem in a shoulder going completely around the neck and adapted to rest against the sawed-off end of the femur. Such an arrangement was considered necessary to allow the element to rest securely on the femur, providing good force transmission. However time has proven that such a shoulder is likely to create necrosis and is therefore disadvantageous.

OBJECTS OF THE INVENTION

It is therefore an object of the present invention to provide an improved hip-joint prosthesis.

Another object of this invention is the provision of an improved socket for such a hip joint which has a minimal size and maximum strength.

Yet another object is to provide such a socket which is readily securable in the ilium and whose position can be ascertained by means of a X-ray.

A further object is to provide a femur element for such a hip-joint prosthesis which is securely receivable within the femur, and which is not likely to form necrosis therein.

SUMMARY OF THE INVENTION

These objects are attained according to the present invention in a prosthetic hip-joint comprising a femoral element formed with a ball head and a stem projecting from the head and adapted to be received within the upper end of the femur. A generally hemispherical socket element has an inner surface formed with a hemispherical cavity adapted to receive the ball head. The outer surface of the socket element is stepped and subdivided into two regions: a lower quarter-spherical region having a center of curvature lying above the center of curvature of the ball-receiving cavity, and an upper quarter-spherical region joining the lower region and having a center of curvature coinciding with the center of curvature of the cavity. The upper region has a radius of curvature which is longer than the radius of curvature of the lower region by a difference greater than the offset distance between the center of curvature of the lower region and the center of curvature of the cavity.

A hip joint according to this invention therefore has a uniform thickness in the quadrant above the ball head, so that its strength is uniform in this region. In addition the decreased radius of curvature of the lower quadrant considerably reduces the size of the socket element so as to allow it to be fit into an ilium with mininum damage thereto.

In accordance with another feature of this invention the outer surface is formed with a step between the lower region and the upper region and this step is formed with a chamfer. In a socket where the cavity is exactly hemispherical the step defines a plane perpendicular to the rim of the cavity. The rim of the cavity further in accordance with this invention defines a plane in which lies the center of curvatures of the lower and upper region.

According yet to another feature of this invention the outer surface is formed with a plurality of criss-crossing grooves arranged meridian-fashion. At least one of these grooves is fitted with a metal wire. This metal wire will show up in an X-ray and allow an exact determination of how the socket element is lying within the ilium. In accordance with this invention the metal wire lies in a plane perpendicular to the rim and step planes and extends across the upper region to the outside face of the socket element.

In accordance with a further feature of this invention the neck is joined to the stem received in the epiphyseal-diaphyseal cavity of the femur and this neck is formed on opposite lateral sides with a pair of separate shoulders and is blended between the shoulders smoothly into the stem. Such an arrangement is used according to the present invention because it has been found surprisingly possible to fasten the femur element within the femur with sufficient security simply by using one of the modern bonding agents. It is necessary to abut the femur element directly on the sawed-off end of the femur for support, the shoulders merely serving to position this element during its installation.

BRIEF DESCRIPTION OF THE DRAWING

The above and other objects, features, and advantages will become more readily apparent from the following, reference being made to the accompanying drawing in which:

FIG. 1 is a vertical section through a hip prosthesis in accordance with the present invention;

FIGS. 2 and 3 are side and top views, respectively, of the femoral element in accordance with this invention;

FIG. 4 is a section through the socket according to the present invention; and

FIG. 5 is a top view of the socket shown in FIG. 4.

SPECIFIC DESCRIPTION

As shown in FIG. 1 the hip-joint prosthesis according to the present invention comprises a femoral element adapted to be received within the epiphyseal-diaphyseal cavity of a femur 3, and a socket element 7 adapted to be received in an ilium 9 at the acetabulum thereof.

The femoral element 1 is made of stainless steel and is formed with a tapered stem 2 connected via a neck 4 to a spherical ball head 5 of diameter D. The neck 4 is of generally hyperboloidal shape and blends smoothly into the ball 5 on one side. The stem 2 is generally flat and blends at its widest region smoothly into the other side of the neck 4. Two diametrically opposite shoulders 8 are formed by the neck 4 at the flat sides of the stem 2. These shoulders 8 are adapted to lie on the sawed-off planar surface of the end of the femur 3 indicated by dot-dash lines $a-a'$ in FIG. 1. In practice the head is sawed off the thigh bone at the indicated angle and the epiphyseal-diaphyseal cavity is reamed out. Then this cavity is substantially filled with a bonding agent, and the stem 2 forced therein. This stem 2 has an axis A lying at an angle to the central axis $A^-$ of the neck, so that the ball 5 lies at the position the head of the thigh bone assumed before it was removed. The shoulders 8 do not serve a support function, but merely are used to position the element 1 properly in place in the femur 3.

The socket element 7 shown in FIGS. 4 and 5 is made of a synthetic resin such as polytetrafluorethylene. This element 7 is formed with a hemispherical cavity 6 having a radius of curvature $R''$ corresponding to D/2. The center of Curvature C of this cavity 6 lies in a plane P defined by the rim of this cavity 6. The outer surface of the socket element 7 is subdivided into an upper region 10 having a radius of curvature R centered on the point C, and a lower region 11 having a radius of curvature $R'$ having a center of curvature $C'$ lying in plane P above the center C.

Both of these regions 10 and 11 are quarter-cylindrical in shape and, with the socket element 7 installed as shown in the ilium 9, the region 10 lies above the center C. The distance $d$ between the centers C and $C'$ is greater than the difference between the radii R and $R'$ so that a step 15 is formed which lies in a plane $P'$ passing through the center C and defining the edges of the quarter-cylindrical surfaces 10 and 11. The planes $P'$ and P are perpendicular.

The ledge 15 is formed with a chamfer 12. In addition, the surfaces 10 and 11 are formed with meridian-like grooves 13 which are used to stabilize the socket element 7 in the ilium 9. The socket 7 is installed by forming a cavity slightly larger than the socket 7 in the ilium 9 at the acetabulum thereof. This cavity is filled with an appropriate surgical adhesive, and the socket element 7 is forced into it. The adhesive fills the groove 13, thereby preventing the socket element 7 from moving relative to the ilium 9.

In addition, a wire 14 is provided which lies in a plane $P''$ perpendicular to both of the planes P and $P'$. This wire 14 starts at the edge 15 and extends across the upper surface 10 in a groove 13 thereof, and extends around the face 16 of the socket element 7. The wire 14 is opaque to X-radiation so that a post-operative X-ray will readily indicate the position of the otherwise transparent socket element 7.

A diameter D, which is equal to $2R''$, of 26 millimeters has been found most advantageous in practice. A stem 2 having an overall length L as indicated in FIG. 2 of 12cm is used with necks having a diameter $D'$ of 25 mm and 30 mm. In addition a smaller size femoral element having a neck with a diameter $D'$ of 15 mm and a stem length L of 10 cm is used for correcting congenital luxations in all patients. Similarly elements 1 are used which do not have a stem axis A offset from the neck axis $A'$ for certain high congenital luxations.

The socket is provided in several sizes which are used depending on the size of the patient. Thus five different sizes are generally needed, those having a maximum outer dimension $D''$ as shown in FIG. 4 of 41, 46, 52, 68, and 60 mm are used. As a general rule the 46 and 52 mm sizes are used, with the 41 mm size being used for very small subjects. These various types of femoral and socket elements allow sixteen combinations to be made, which allow the hip joint according to the present invention to be fitted to virtually any subject.

I claim:

1. A prosthetic hip joint comprising:
   a femoral element formed with a ball head and a stem projecting from said head and adapted to be received within the upper end of a femur, and
   a generally hemispherical socket element adapted to be secured in a predetermined orientation in an ilium at the acetabulum thereof and having an inner surface formed as a generally hemispherical cavity having a single center of curvature and receiving snugly said ball head, and having an outer surface formed as a lower quarter-spherical region having a center of curvature lying above the center of curvature of said cavity and an upper quarter-spherical region adjoining and above said lower region and having a center of curvature coinciding with said single center of curvature of said cavity, said socket element being of uniform radial thickness throughout said upper region and of upwardly increasing radial thickness at said lower region.

2. The joint defined in claim 1 wherein said outer surface is formed with a step between said lower region and said upper region, said radial thickness of said upper region being greater than the maximum radial thickness of said lower region.

3. The joint defined in claim 2 wherein said step is formed with a chamfer.

4. The joint defined in claim 2 wherein said outer surface is formed with a plurality of crossing grooves.

5. The joint defined in claim 4, further comprising a metal wire disposed in one of said grooves.

6. The joint defined in claim 5 wherein said one groove extends from said stop across the upper region.

7. The joint defined in claim 2 wherein said stem is tapered and said femoral element is formed with a neck joining said ball head to said stem, said neck blending at least partially smoothly into said stem.

8. The joint defined in claim 7 wherein said neck is formed on opposite lateral sides with a pair of separate shoulders.

* * * * *